UNITED STATES PATENT OFFICE 2,647,144

OXIDATIVE CONDENSATION OF AMINES AND DITHIO ACIDS

George E. P. Smith, Jr., Akron, Ohio, assignor to The Firestone Tire & Rubber Co., Akron, Ohio, a corporation of Ohio No Drawing. Application December 30, 1948, Serial No. 68,397

3 Claims. (Cl. 260—551)

This invention relates to the preparation of thio amides by oxidative condensation of amines and dithio acids. The reaction is illustrated as follows:

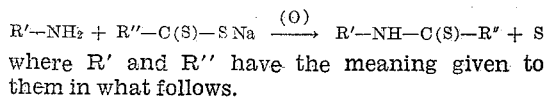

where R' and R" have the meaning given to them in what follows.

The reaction is carried out by mixing an oxidizing agent with a solution of a salt of an aryl carbidithioic acid and an amine and removing one sulfur from the salt by oxidation. Any oxidizing agent may be used which will cause the reaction to take place without causing objectionable decomposition of the reactants or of the reaction product.

The amine used in carrying out the reaction is preferably a primary amine, although a secondary amine may be employed. The primary aliphatic-type amines are represented by the formula:

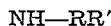

in which R and R' are hydrogen, or alkyl, alkenyl, cycloalkyl (e. g. cyclohexyl, cyclopentyl, etc.), substituted-alkyl (e. g. benzyl, furfuryl, tetrahydrofurfuryl, etc.), or heterocyclic (e. g. morpholyl, piperidyl, etc.) radicals. Due to the insolubility of longer-chain amines, ordinarily the reaction will be limited to the use of amines containing no more than about eight carbon atoms. By the use of a solvent other than water or the mixture of such a solvent with water, longer-chain amines may be used such as lauryl, etc. Although beta-furfuryl amine may be employed, the reference to furfuryl and tetrahydrofurfuryl amines herein refers to the alpha derivatives. Thus, ammonia may be used and amines such as, for example, methylamine, ethylamine, propylamine, the butyl amines, the amyl amines including cyclopentylamine, the hexyl amines including cyclohexylamine, the heptylamines, the octylamines, dodecylamine, octadecylamine, nonadecylamine, dimethylamine, the dioctylamines, allyl amine, methallylamine, crotonylamine, furfuryl amine, tetrahydrofurfuryl amine, benzylamine, piperidine, morpholine, etc.

The reaction is carried out with any soluble salt of a carbidithioic acid. In aqueous solutions sodium, potassium or lithium salt will ordinarily be used although the salt of any soluble alkali metal (including ammonia) or alkaline earth metal salt may be employed such as magnesium, calcium, etc. The acids which may be employed include, for example, dithiobenzoic acid, the dithio-alpha-naphthoic acids, dithio-p-toluic acid, dithio-alpha-furoic acid, dithio-p-chlorobenzoic acid, dithio-2,4-dichlorobenzoic acid, dithio-p-nitrobenzoic acid, dithio-beta-chloro-alpha-naphthoic acid, dithio-p-phenylbenzoic acid, dithio-2-methyl-4-ethylbenzoic acid, dithiobutyric acid, di-thiophenylacetic acid, dithiochloroacetic acid, terpenylcarbidithioic acid, dithio-beta-naphthoic acid, dithio-abietic acid, dithionicotinic acid, dithiothiophene carboxylic acids, etc.

The reaction is preferably carried out in aqueous solution if the reactants and reaction product are soluble in water.

The oxidizing agents employed should not be so strong as to decompose either reactant or the reaction product. A mild oxidizing agent or one of medium strength will be employed, such as, for example, iodine, chlorine, bromine, sodium hypochlorite, sodium hypobromite, sodium chlorite, potassium ferricyanide, hydrogen peroxide, sodium perborate, potassium persulfate, sodium percarbonate, etc.

The following examples illustrate the invention:

Example I

*N-cyclohexylthiobenzamide.*—To a solution of 13.2 g. (0.075 mole) of sodium dithiobenzoate in 250 ml. of water was added 37.5 g. (0.375 mole) of cyclohexylamine and then a solution of 27 g. (0.1 mole) of iodine and 30 g. of potassium iodide in 200 ml. of water was added slowly and with stirring at a temperature of 5–10° C. The red color of the solution disappeared and an oil formed. After allowing the reaction mixture to stand overnight, the oil was extracted with ether, the ether solution was washed several times with water and evaporated. The oily residue was triturated several times with water and gasoline was added, resulting in the formation of a yellow crystalline solid which was separated by filtration and dried. It melted at 82–85° C. After two recrystallizations from gasoline it melted at 91–92° C.

Calc'd for $C_{13}H_{17}NS$ _____ N, 6.40; S, 14.60
Found _____ N, 6.44; S, 14.65

Example II

*N-cyclohexylthio-p-toluamide.*—This was prepared in a manner similar to that described above. After dissolving 5.0 g. (0.03 mole) of dithio-p-toluic acid, 2.9 g. of sodium hydroxide and 15.7 g. (0.15 mole) of cyclohexylamine in water, the solution was diluted to 250 ml. and a solution of 8.09 g. (0.03 mole) of iodine dissolved in potassium iodide solution was added slowly and with stirring. The oily precipitate was isolated in ether and the ether solution dried. Evaporation of the ether left a pasty solid weighing 6.7 g., a yield of 95 per cent. The melting point was 80-90° C. Repeated recrystallizations from ether-petroleum ether yielded a bright yellow crystalline compound melting at 104-105° C.

Calc'd for $C_{14}H_{10}NS$ _____ N, 6.00; S, 13.72
Found _____ N, 5.96; S, 13.64

Example III

*N-cyclohexylthio-alpha-naphthamide.*—To an aqueous solution of 100 g. (1.0 mole) of cyclohexylamine, 0.2 mole of sodium alpha-dithionaphthoate and 4 g. of sodium hydroxide was added at 5-10° C., with stirring, 0.2 mole of iodine (200 ml. of an iodine-potassium iodide solution 1.0 molar with respect to iodine). A bright yellow crystalline solid formed which turned to a red oil when the aqueous reaction medium was separated by filtration. This viscous red oil was triturated with several portions of water and finally with alcohol (95%). The oil solidified and the solid was isolated by filtration. It melted at 81-95° C. Recrystallized repeatedly from ether, the melting point was 97-98° C.

Calc'd for $C_{17}H_{19}NS$ _____ N, 5.19; S, 11.76
Found _____ N, 5.19; S, 11.86

The new compounds have potential value as rubber chemicals and intermediates for the preparation of rubber chemicals.

What I claim is:

1. Method of producing a thioaroylamide which comprises reacting cyclohexylamine in the presence of iodine as an oxidizing agent with a soluble salt of an aryl carbodithioic acid which is free from other oxidizable groups than sulfur.

2. Method of producing a thioaroylamide which comprises reacting a primary cycloalkylamine in the presence of iodine as an oxidizing agent with the sodium salt of an aryl carbodithioic acid which is free from other oxidizable groups than sulfur.

3. Method of producing a thioaroylamide which comprises reacting (1) a primary amine of the group consisting of alkyl and cycloalkyl amines, in the presence of an oxidizing agent of the group consisting of iodine, chlorine, bromine, sodium hypochlorite, sodium hypobromite, sodium chlorite, potassium ferricyanide, hydrogen peroxide, sodium perborate, potassium persulfate and sodium percarbonate, with (2) a soluble salt of an aryl carbodithioic acid which is free from other oxidizable groups than sulfur.

GEORGE E. P. SMITH, JR.

References Cited in the file of this patent

UNITED STATES PATENTS

| Number | Name | Date |
|---|---|---|
| 2,201,170 | Hanford | May 21, 1940 |
| 2,220,243 | Hoffer | Nov. 5, 1940 |
| 8,223,130 | Prutton | Nov. 26, 1940 |
| 2,333,468 | Cooper | Nov. 2, 1943 |
| 2,381,392 | Smith et al. | Aug. 7, 1945 |
| 2,419,283 | Paul et al. | Apr. 22, 1947 |
| 2,424,921 | Smith et al. | July 29, 1947 |
| 2,560,046 | Alliger | July 10, 1951 |

OTHER REFERENCES

Chemical Abstracts, vol. 22 (1928), p. 764.
Chemical Abstracts, vol. 34 (1940), p. 1981.